(12) United States Patent
Bortolon et al.

(10) Patent No.: US 9,809,132 B2
(45) Date of Patent: Nov. 7, 2017

(54) VARIABLE-SIZED OCCUPANT SUPPORT

(71) Applicants: FAURECIA AUTOMOTIVE SEATING KOREA LIMITED, Suwon-si, Gyeonggi-do (KR); FAURECIA AUTOMOTIVE SEATING, LLC, Troy, MI (US)

(72) Inventors: Christopher A. Bortolon, Commerce Township, MI (US); John M. Perraut, Rochester Hill, MI (US); Laurent Jaillet, Seongnam-si (KR); Sang-Nyeong Yun, Hawsung-si (KR)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 49 days.

(21) Appl. No.: 15/004,581

(22) Filed: Jan. 22, 2016

(65) Prior Publication Data

US 2016/0137104 A1    May 19, 2016

Related U.S. Application Data

(63) Continuation-in-part of application No. PCT/KR2014/007284, filed on Aug. 6, 2014.
(Continued)

(30) Foreign Application Priority Data

Aug. 6, 2013   (KR) .................. 10-2013-0093152

(51) Int. Cl.
*A47C 3/00* (2006.01)
*B60N 2/02* (2006.01)
(Continued)

(52) U.S. Cl.
CPC ......... *B60N 2/0284* (2013.01); *B60N 2/4492* (2015.04); *B60N 2/4808* (2013.01);
(Continued)

(58) Field of Classification Search
CPC ........ A47C 1/023; A61G 5/1064; B60N 2/62; B60N 2/4415
(Continued)

(56) References Cited

U.S. PATENT DOCUMENTS

| | | | | |
|---|---|---|---|---|
| 4,324,431 A | * | 4/1982 | Murphy ................... | B60N 2/62 297/284.11 |
| 4,334,709 A | * | 6/1982 | Akiyama ................. | B60N 2/62 297/284.11 |

(Continued)

FOREIGN PATENT DOCUMENTS

| | | |
|---|---|---|
| DE | 4104697 | 3/1997 |
| DE | 102009019033 | 10/2010 |

(Continued)

OTHER PUBLICATIONS

International Search Report, Application No. PCT/KR2014/007284, dated Oct. 30, 2014.
(Continued)

*Primary Examiner* — Jose V Chen
(74) *Attorney, Agent, or Firm* — Barnes & Thornburg LLP

(57) ABSTRACT

A pad is adapted to set on a seat pan included in a vehicle seat. The pad includes a cushion on the seat pan and a cushion cover on the cushion.

22 Claims, 12 Drawing Sheets

Related U.S. Application Data

(60) Provisional application No. 62/106,551, filed on Jan. 22, 2015.

(51) Int. Cl.
  *B60N 2/62* (2006.01)
  *B60N 2/48* (2006.01)
  *B60N 2/44* (2006.01)
  *B60N 2/22* (2006.01)

(52) U.S. Cl.
  CPC ........ *B60N 2/62* (2013.01); *B60N 2002/0288* (2013.01); *B60N 2002/2204* (2013.01)

(58) Field of Classification Search
  USPC .......................................... 297/284.11, 284.1
  See application file for complete search history.

(56) References Cited

U.S. PATENT DOCUMENTS

| | | | |
|---|---|---|---|
| 4,401,343 A | 8/1983 | Schmidt | |
| 4,615,563 A * | 10/1986 | Kobayashi | A47C 7/022 297/284.11 |
| 4,629,248 A * | 12/1986 | Mawbey | B60N 2/62 297/284.11 |
| 5,171,062 A | 12/1992 | Courtois | |
| 5,588,708 A * | 12/1996 | Rykken | A47C 7/506 297/284.11 |
| 5,622,406 A | 4/1997 | Meschkat | |
| 6,106,063 A * | 8/2000 | Dauphin | A47C 1/023 297/284.1 |
| 6,267,445 B1 | 7/2001 | Marais | |
| 6,419,317 B1 | 7/2002 | Westrich | |
| 6,454,353 B1 | 9/2002 | Knaus | |
| 6,601,918 B2 | 8/2003 | Mattsson | |
| 6,926,361 B2 | 8/2005 | Link | |
| 7,108,322 B2 | 9/2006 | Erker | |
| 7,192,087 B2 | 3/2007 | Adragna | |
| 7,571,964 B2 | 8/2009 | Taniguchi | |
| 7,578,554 B2 | 8/2009 | Lee | |
| 7,597,398 B2 * | 10/2009 | Lindsay | B60N 2/0224 297/283.2 |
| 7,611,201 B2 | 11/2009 | Moriyama | |
| 7,614,693 B2 * | 11/2009 | Ito | B60N 2/0284 297/284.11 |
| 7,669,928 B2 * | 3/2010 | Snyder | B60N 2/0232 297/283.2 |
| 7,669,929 B2 * | 3/2010 | Simon | B60N 2/0224 297/284.11 |
| 7,753,446 B2 | 7/2010 | Kübler | |
| 7,871,126 B2 * | 1/2011 | Becker | B60N 2/0284 297/284.11 |
| 7,874,621 B2 | 1/2011 | Gumbrich | |
| 7,909,401 B2 | 3/2011 | Hofmann | |
| 7,997,648 B2 | 8/2011 | Becker | |
| 8,011,728 B2 * | 9/2011 | Kohl | B60N 2/0284 297/284.11 |
| 8,128,167 B2 | 3/2012 | Zhong | |
| 8,162,397 B2 * | 4/2012 | Booth | B60N 2/0284 297/284.11 |
| 8,408,646 B2 | 4/2013 | Harper | |
| 8,991,921 B2 | 3/2015 | Peterson | |
| 9,016,783 B2 | 4/2015 | Line | |
| 9,016,784 B2 | 4/2015 | Line | |
| 9,016,785 B2 | 4/2015 | Freisleben | |
| 9,365,142 B1 | 6/2016 | Line | |
| 9,399,418 B2 | 7/2016 | Line | |
| 9,421,885 B2 * | 8/2016 | Wiegelmann | B60N 2/0284 |
| 2008/0191531 A1 | 8/2008 | Hoffmann | |
| 2009/0091172 A1 | 4/2009 | Kim | |
| 2013/0257126 A1 | 10/2013 | Freisleben et al. | |
| 2014/0292051 A1 | 10/2014 | Planson | |
| 2015/0258914 A1 | 9/2015 | Lee | |
| 2016/0304016 A1 | 10/2016 | Line | |
| 2016/0339805 A1 | 11/2016 | Kim | |
| 2016/0339806 A1 | 11/2016 | Popescu | |
| 2016/0339820 A1 | 11/2016 | Kajino | |

FOREIGN PATENT DOCUMENTS

| | | |
|---|---|---|
| DE | 102008004121 | 4/2011 |
| DE | 102011116449 | 4/2013 |
| DE | 202012214296 | 2/2014 |
| DE | 102008049923 | 4/2014 |
| EP | 3095638 | 11/2016 |
| FR | 2969546 | 6/2012 |
| GB | 22522723 | 8/1992 |
| JP | 07-013244 U | 3/1995 |
| JP | 2000-157376 | 6/2000 |
| JP | 2003-002090 | 1/2003 |
| JP | 2007130228 | 5/2007 |
| JP | 4438564 | 3/2010 |
| KR | 10-2009-0035090 A | 4/2009 |
| KR | 20-2011-0011890 U | 12/2011 |
| KR | 10-2013-0064139 A | 6/2013 |
| WO | 2010057335 | 5/2010 |
| WO | 2012055698 | 5/2012 |
| WO | 2012-107675 | 8/2012 |
| WO | 2016120143 | 8/2016 |

OTHER PUBLICATIONS

International Written Opinion, Application No. PCT/KR2014/007284, dated Oct. 30, 2014.

* cited by examiner

VARIABLE-SIZED OCCUPANT SUPPORT

PRIORITY CLAIM

This application is a continuation-in-part of PCT/KR2014/007284, filed Aug. 6, 2014, and claims priority under 35 U.S.C. §119(e) to U.S. Provisional Application Ser. No. 62/106,551, filed Jan. 22, 2015, each of which is expressly incorporated by reference herein.

BACKGROUND

The present disclosure relates to an occupant support, and particularly to an occupant support used in a vehicle. More particularly, the present disclosure relates to an occupant support having a variable dimension.

SUMMARY

According to the present disclosure, an occupant-support base includes a stationary seat pan and a pad coupled to the seat pan. The pad is configured to provide comfort to an occupant resting on the occupant-support base and a pleasing aesthetic to the occupant. The pad includes a cushion cover arranged to cover the seat pan and a cushion located between the seat pan and the cushion cover.

In illustrative embodiments, the occupant-support base further includes a pad-extension system. The pad-extension system is configured to provide means for moving a portion of the pad relative to the seat pan between a retracted configuration and an extended configuration without causing a gap to be formed in the pad during movement from the retracted configuration to the extended configuration so that aesthetics are maximized and dirt accumulation on the pad is minimized.

In illustrative embodiments, the pad-extension system includes a pan mount coupled to the seat pan in a fixed position, a movable pad support, and a pad-support mover. The movable pad support is coupled to the pan mount to move back and forth relative to the seat pan. The pad-support mover is arranged to extend between and interconnect the movable pad support and the pan mount to cause the movable pad support to move back and forth.

In illustrative embodiments, the pad-support mover is an inflatable bladder arranged between the movable pad support and the pan mount. The inflatable bladder pushes the movable leg support away from the pan mount when inflated to cause the pad-extension system to assume the expanded configuration. Return springs are provided in the illustrative embodiment to pull the movable pad support back toward the pan mount when the inflatable bladder is deflated to cause the pad-extension system to assume the retracted configuration.

In illustrative embodiments, the pad-support mover includes an electric motor and a rotary screw. The rotary screw is arranged to extend between and interconnect the pan mount and the movable pad support. The electric motor turns in a first direction to cause the rotary screw to rotate in the first direction causing the movable pad support to move away from the pan mount to cause the pad-extension system to assume the expanded configuration. The electric motor turns in a second direction to cause the rotary screw to rotate in the second direction causing the movable pad support to move toward the pan mount to cause the pad-extension system to assume the retracted configuration.

In illustrative embodiments, the pad-extension system further includes a cushion-cover extender. The cushion-cover extender is configured to provide means for varying a size of the cushion cover while the pad-extension system moves from the retracted configuration to the expanded configuration so that no gap is established between the cushion cover and the movable leg support. In illustrative embodiments, the cushion-cover extender is one or more slip belts arranged to extend between and interconnect a movable end of the cushion cover to the pan mount.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 5A:
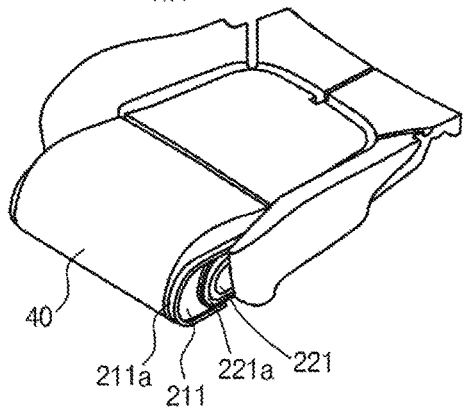
Figure 5B:
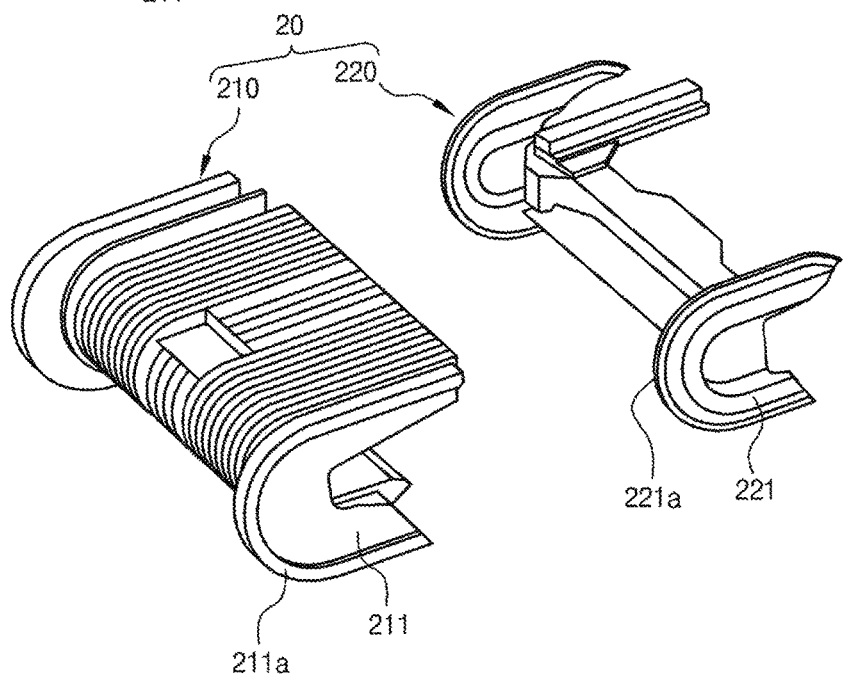
Figure 6A:
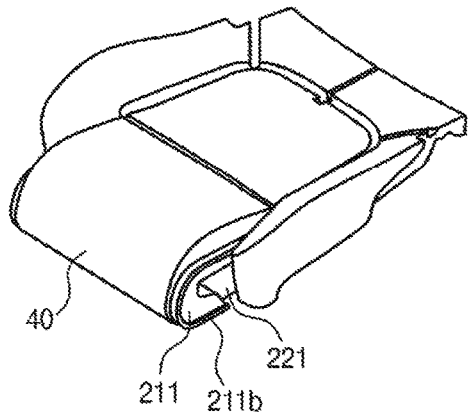
Figure 6B:
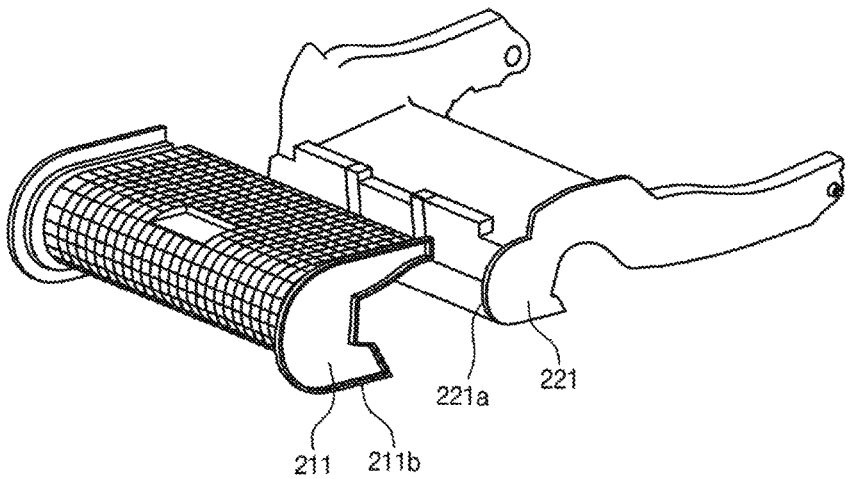
Figure 7A:
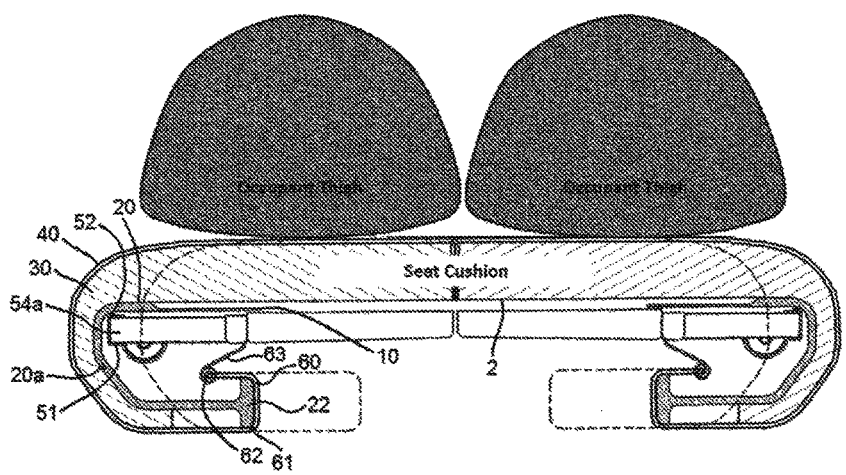
Figure 7B:
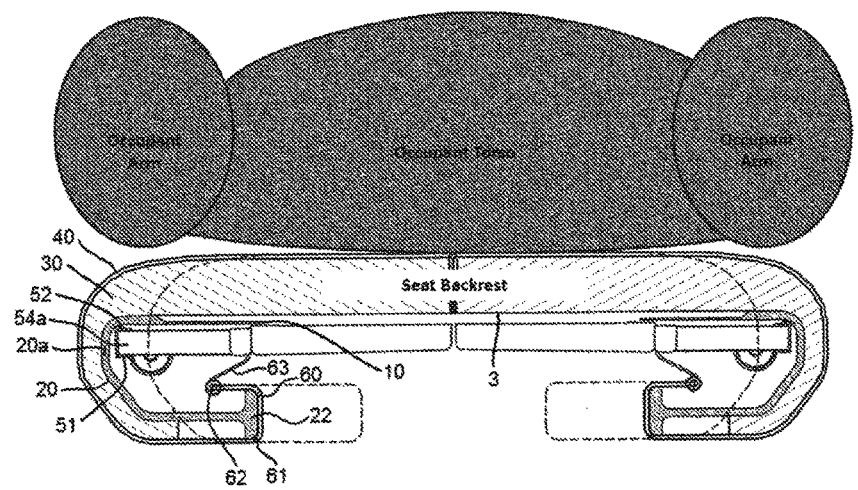
Figure 7C:
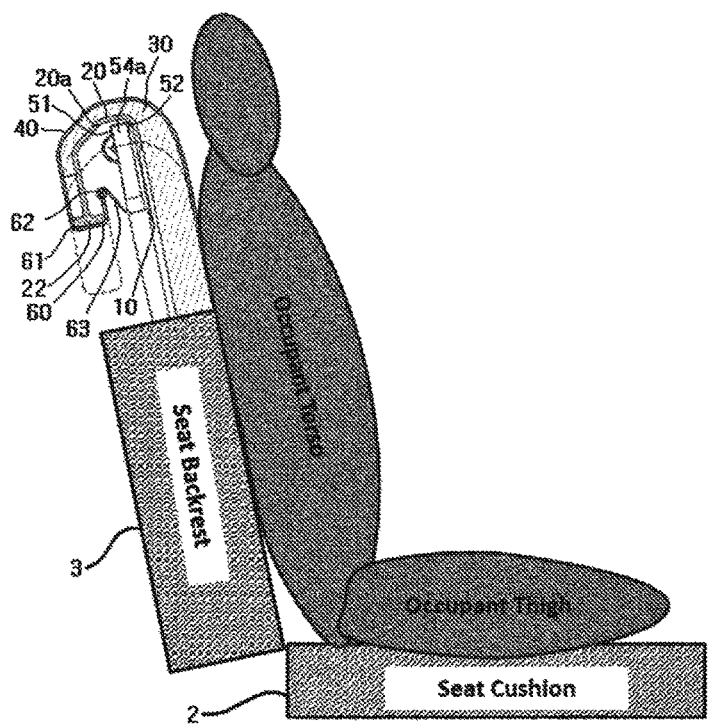
Figure 7D:
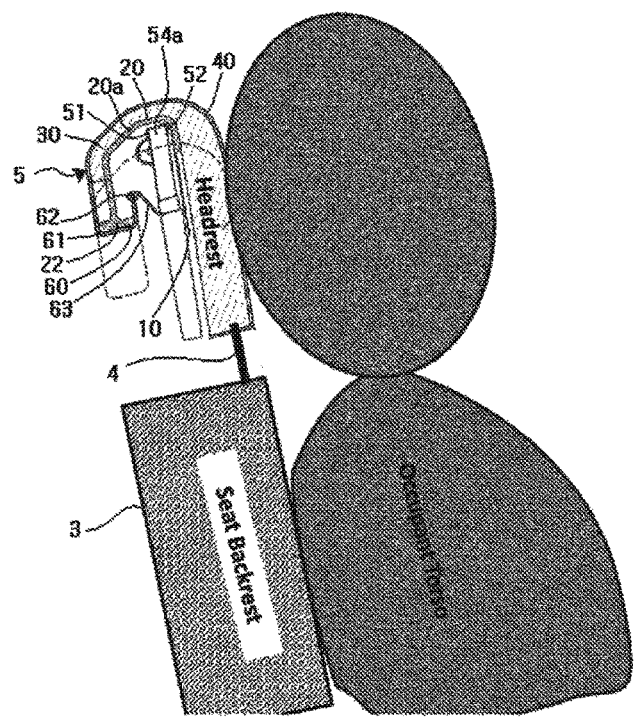
Figure 7E:
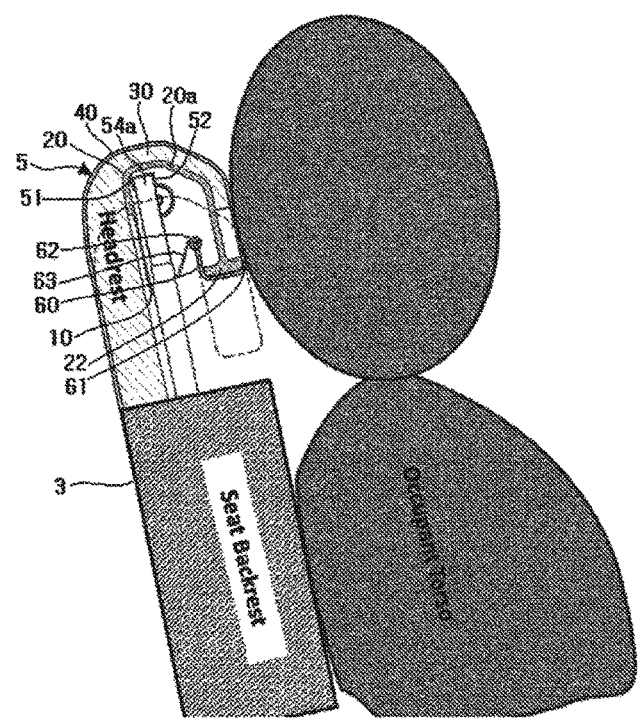
Figure 7F:
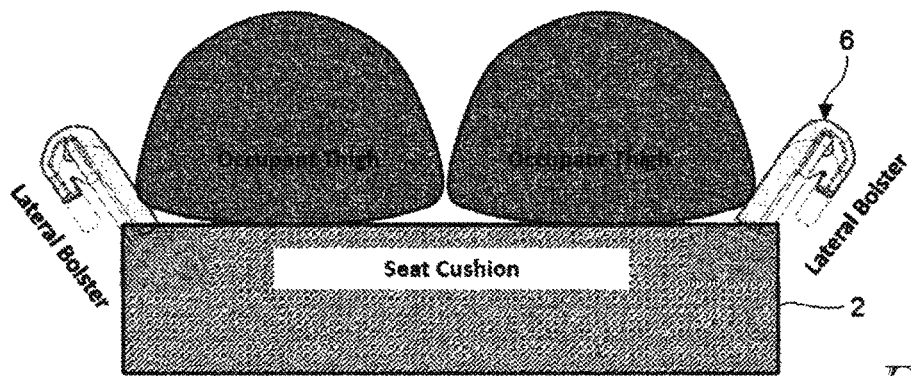
Figure 7G:
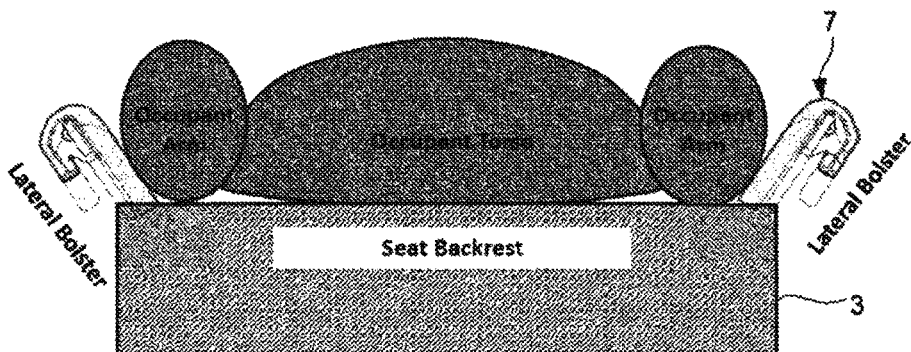
Figure 7H:
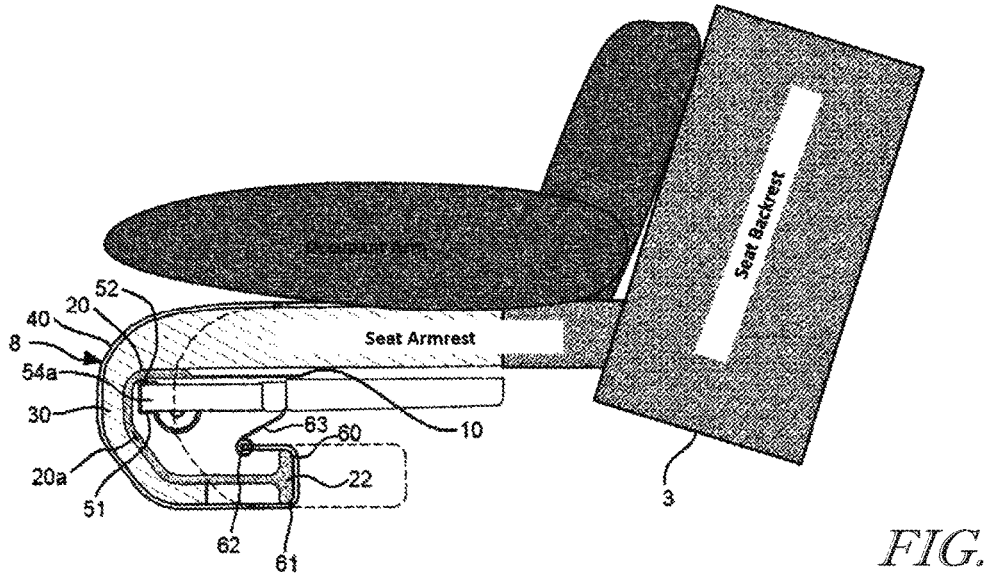
Figure 8:
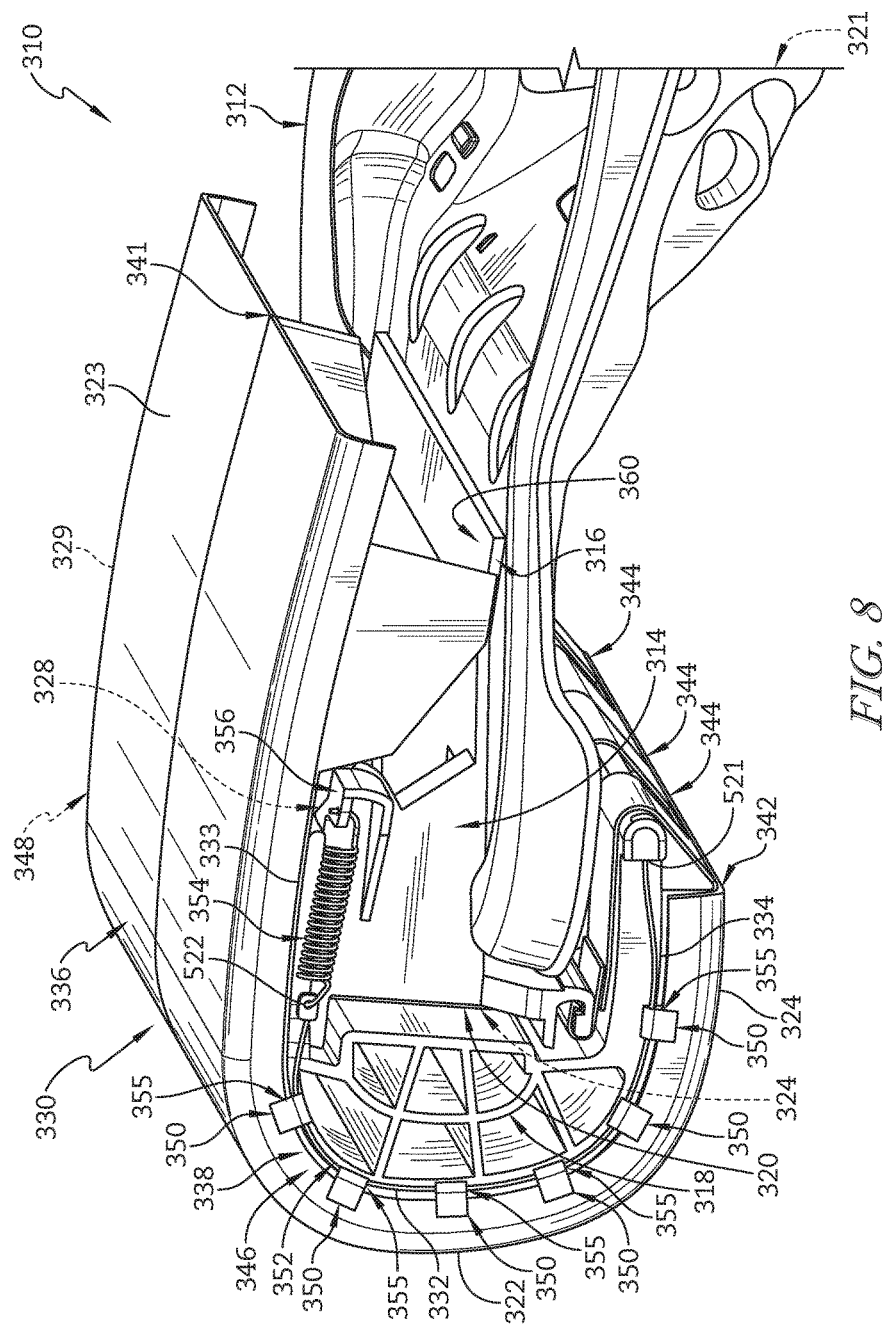
Figure 9:
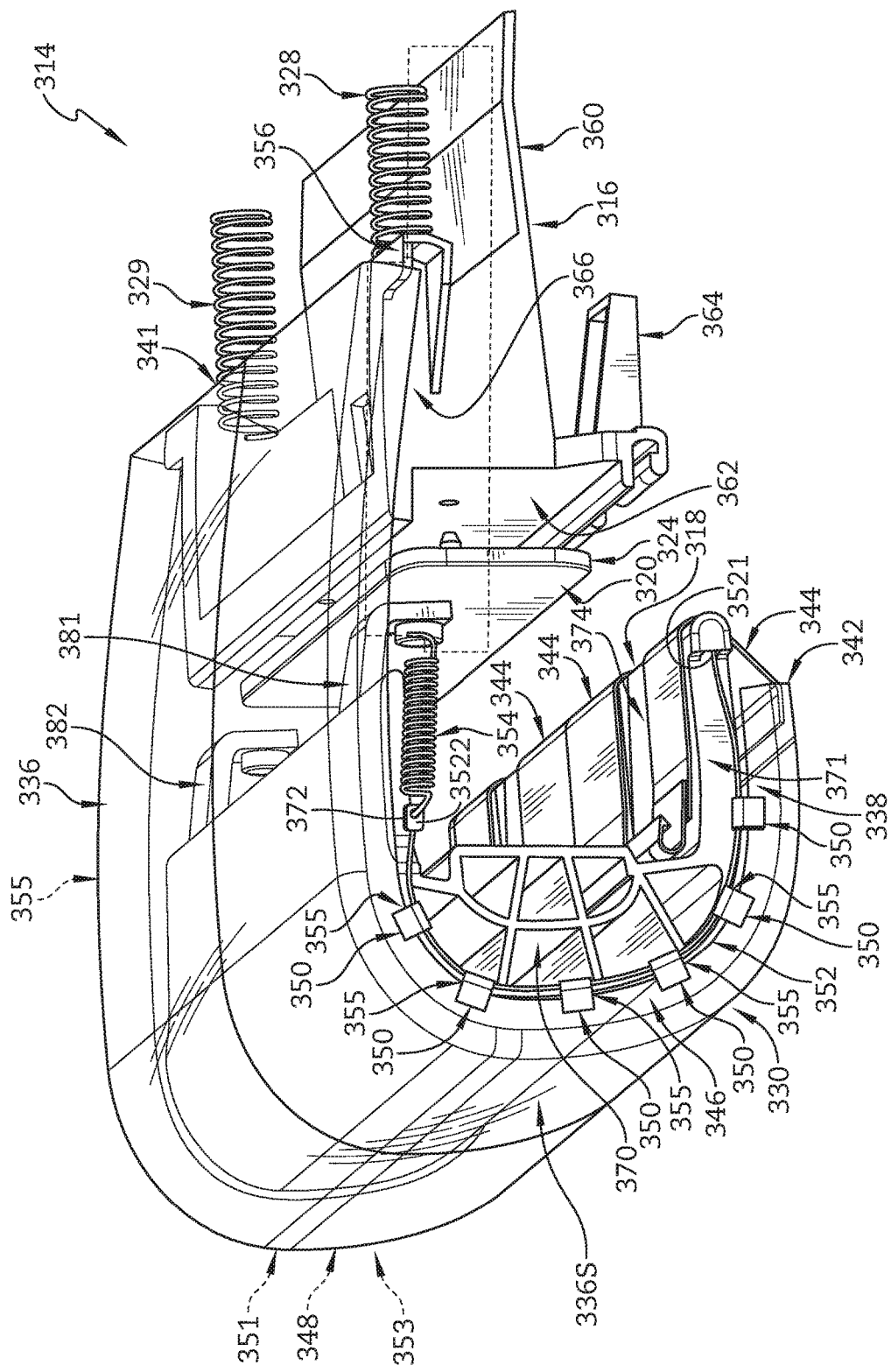
Figures 10, 11:
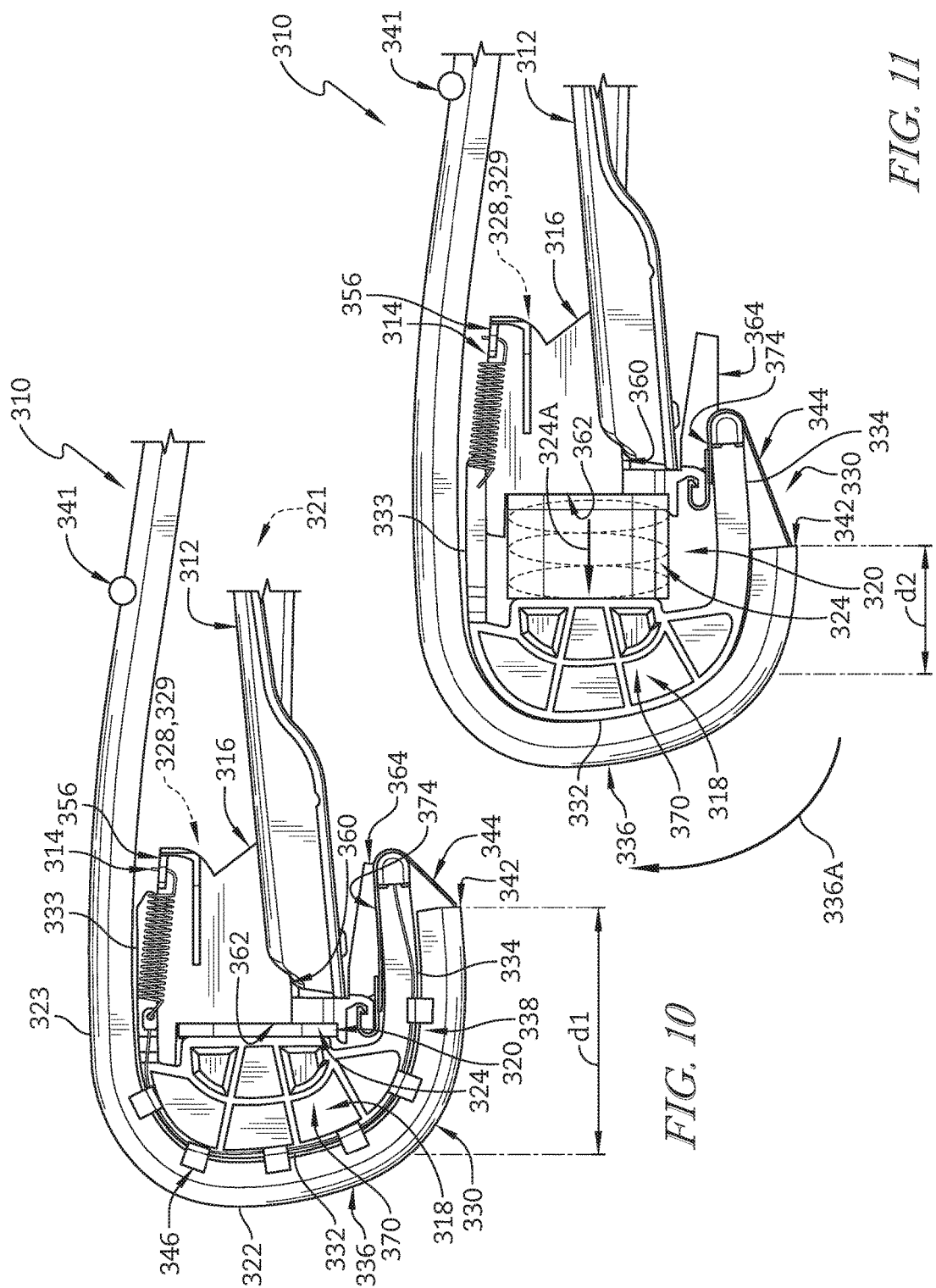
Figure 12:
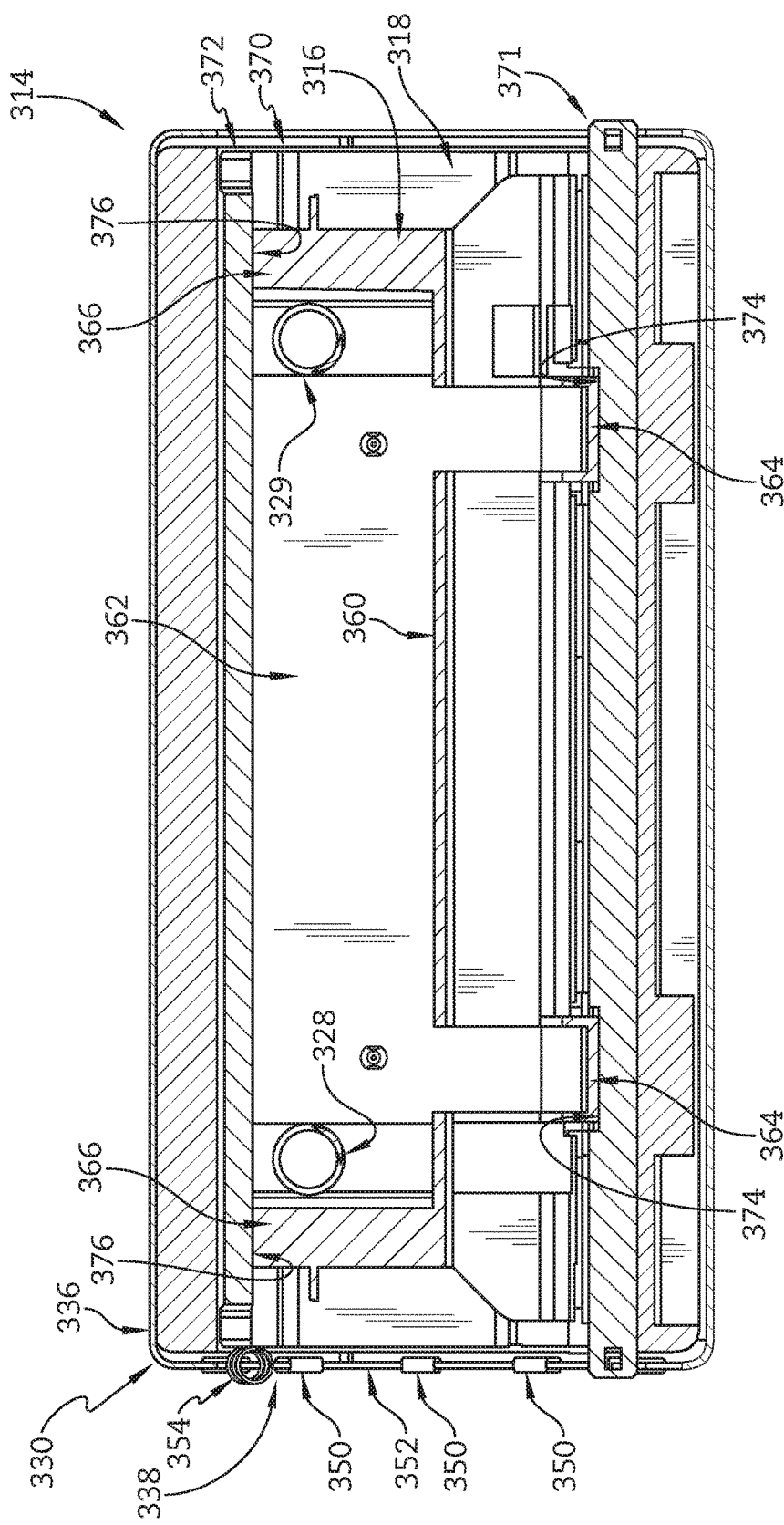
Figures 13, 14:
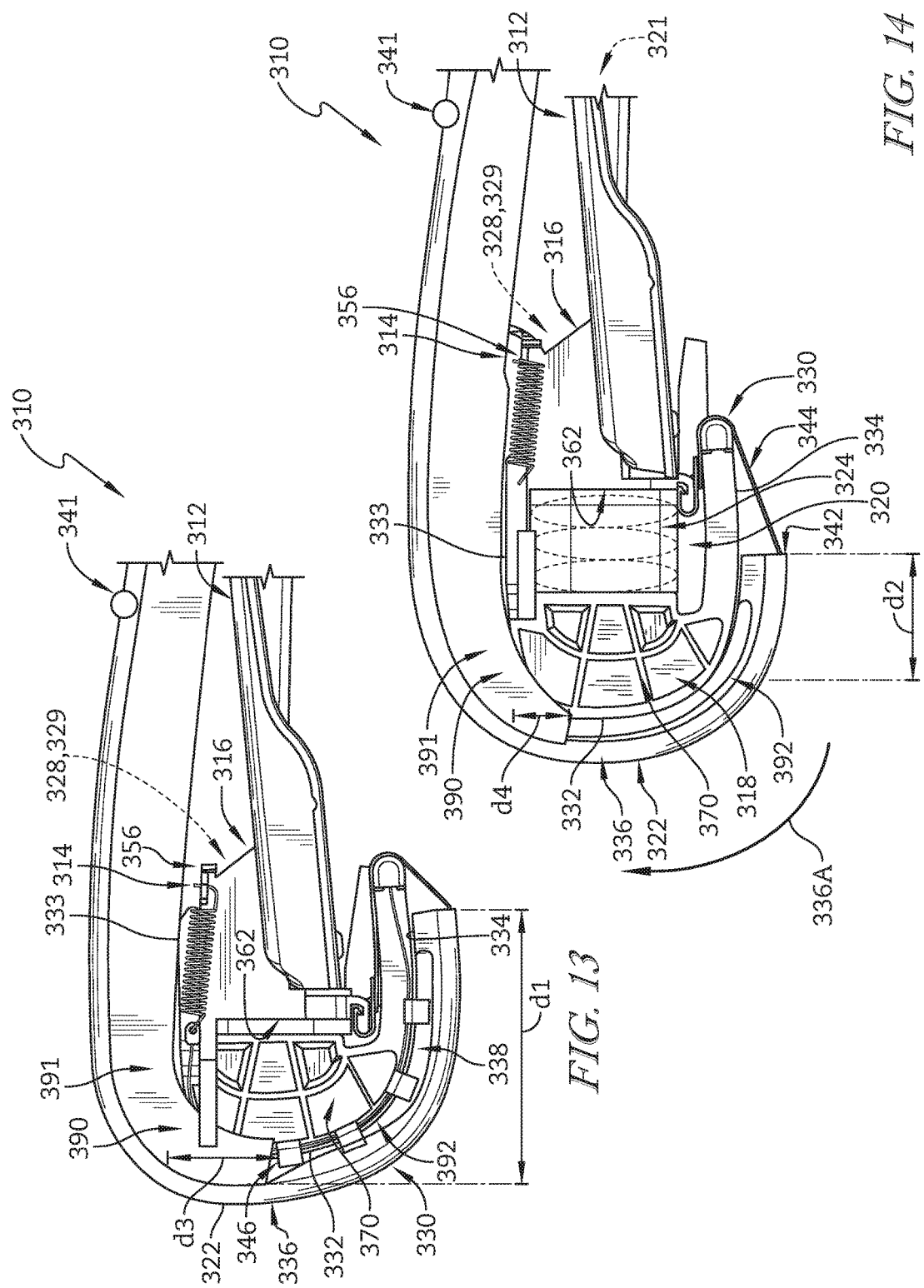

FIG. 5A is a partial perspective view of an occupant-support base in accordance with the present disclosure embodied as a seat bottom of a vehicle seat showing that the occupant-support base further includes a lateral finishing cover that maximizes visual appeal and blocks access to the pad-extension system during movement of the occupant-support base between the extended and retracted configurations;

FIG. 5B is a perspective view of a portion of the occupant-support base of FIG. 5A showing, from left to right, a movable pad support, a pan mount adapted to couple to a seat pan, and lateral finishing covers coupled to opposite sides of the pan mount;

FIG. 6A is a partial perspective view of an occupant-support base in accordance with the present disclosure embodied as a seat bottom of a vehicle seat showing that the occupant-support base further includes a lateral finishing cover that maximizes visual appeal and blocks access to the pad-extension system during movement of the occupant-support base between the extended and retracted configurations;

FIG. 6B is a perspective view of a portion of the occupant-support base of FIG. 6A showing, from left to right, a movable pad support, a pan mount adapted to couple to a seat pan, and lateral finishing covers coupled to opposite sides of the pan mount;

FIGS. 7A-7H are a series of views showing occupant-support bases embodied as different portions of a vehicle seat;

FIG. 7A is a diagrammatic view of an occupant-support base in accordance with the present disclosure embodied as a seat bottom and used to vary a lateral width of the seat bottom;

FIG. 7B is a diagrammatic view of an occupant-support base in accordance with the present disclosure embodied as a seat back and used to vary a lateral width of the seat back;

FIG. 7C is a diagrammatic view of an occupant-support base in accordance with the present disclosure embodied as a backrest and used to vary a vertical height of the backrest;

FIG. 7D is a diagrammatic view of an occupant-support base in accordance with the present disclosure embodied as a headrest and used to vary a vertical height of the headrest;

FIG. 7E is a diagrammatic view of an occupant-support base in accordance with the present disclosure embodied as a different headrest and used to vary a vertical height of the headrest;

FIG. 7F is a diagrammatic view of an occupant-support base in accordance with the present disclosure embodied as a side bolster included in a seat bottom and used to vary a vertical height of the side bolster;

FIG. 7G is a diagrammatic view of an occupant-support base in accordance with the present disclosure embodied as a side bolster included in a seat back and used to vary a lateral width of the side bolster; and used to vary a lateral width of the seat bottom;

FIG. 7H is a diagrammatic view of an occupant-support base in accordance with the present disclosure embodied as an armrest and used to vary a length of the armrest;

FIG. 8 is a perspective view of a portion of an occupant-support base in accordance with the present disclosure showing that the occupant-support base is embodied as a seat bottom and that the occupant-support base includes a seat pan, a gapless pad coupled to the seat pan, and a pad-extension system coupled to the seat pan to change a size of the pad by moving between a retracted configuration suggested in FIG. 10 and an expanded configuration suggested in FIG. 11 without forming a gap along a top side of the gapless pad;

FIG. 9 is a partially exploded perspective assembly view of the pad-extension system shown in FIG. 8 showing that the pad-extension system includes a pan mount coupled to the seat pan, a movable pad support coupled to the pan mount to slide back and forth relative to the mount, a pad-support mover illustrated as an inflatable bladder located between the pan mount and the movable pad support, and return springs located between the pan mount and the movable pad support to pull the movable pad support toward the pan mount when the inflatable bladder is deflated and the extension system is moved from the expanded configuration to the retracted configuration;

FIG. 10 is a side elevation view of the portion of the occupant-support base shown in FIG. 8 when the pad-extension system is in the retracted configuration showing that the pad-support mover is deflated (relaxed) so that the return springs pull the movable pad support toward the pan mount and showing that a cushion cover included in the pad extends a first distance underneath the movable pad support while it also extends over a front side and a top side of the movable pad support;

FIG. 11 is a view similar to FIG. 10 when the pad-extension system is in the expanded configuration showing that the pad-support mover is inflated to push the movable pad support away from the pan mount and showing that the cushion cover of the gapless pad extends a second smaller distance underneath the movable pad support while it also extends over a front side and a top side of the movable leg support;

FIG. 12 is a cross-sectional view of the occupant-support base of FIG. 8 showing that the pan mount includes lower rails received in upwardly opening lower guide tracks formed in the movable pad support and upper rails received in downwardly opening upper guide tracks formed in the movable pad support;

FIG. 13 is a side elevation view of the portion of the occupant-support base shown in FIG. 10 with portions broken away to reveal a tapered foam cushion located under the cushion cover included in the gapless pad showing that the tapered foam cushion extends over a top side of the movable pad support and a third distance along a front side of the movable pad support when the pad-extension system is in the retracted configuration; and FIG. 14 is a view similar to FIG. 13 with the tapered foam cushion arranged under the cushion cover showing that the tapered foam cushion extends over the top side of the movable pad support and a fourth distance, less than the third distance, along the front side of the movable pad support when the pad-extension system is in the expanded configuration.

DETAILED DESCRIPTION

An occupant-support base in accordance with the present disclosure is adapted for use in a vehicle seat. The occupant-support base illustratively includes a seat pan coupled to a seat frame, a pad coupled to the seat pan to maximize comfort to an occupant sitting on the occupant-support base, and a pad-extension system coupled to the seat pan. The pad-extension system is configured to change a size of the pad by moving a portion of the pad between a retracted configuration and an expanded configuration. The occupant-support base may be used as a seat bottom, a backrest, a headrest, a bolster included in a backrest or seat bottom, an armrest, or any combination thereof.

According to the present disclosure, the pad includes a cushion and a cushion cover. The cushion or the cushion cover may be reduced or extended in length, width, and height while being wound inward or unwound relative to the seat pan. The length, width, and height of pad may be varied when the pad is used in a seat bottom, a seat back, a backrest, a headrest, an armrest, and any suitable combination thereof.

Dimensions of the pad are varied by the pad-extension system. The pad-extension system includes a pan mount, a movable pad support, and a pad-support mover. The pan mount is coupled to the seat pan in a fixed position relative to the seat pan. The movable pad support is coupled to the pan mount to move relative thereto while supporting a portion of the pad thereon. The pad includes a fixed end coupled to the seat pan and a movable end located at a regular point at which the pad does not move while a dimension (the length, the width, or the height) of the pad is changed. The total length of the pad may be increased or decreased by the pad-support mover.

Figure 1:
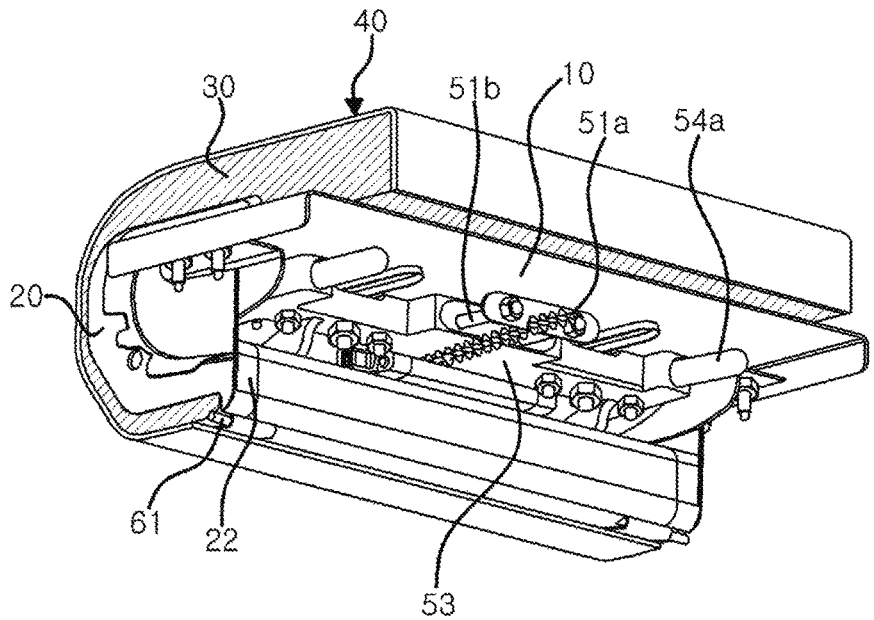
FIG. 1 is a rear perspective view of a first embodiment of an occupant-support base in accordance with the present disclosure suggesting that the occupant-support base includes seat pan, an extendable pad, and a pad-extension system interconnecting the extendable pad and the seat pan to cause the extendable pad to vary in size and shape without forming a gap in the pad.
Figure 2:
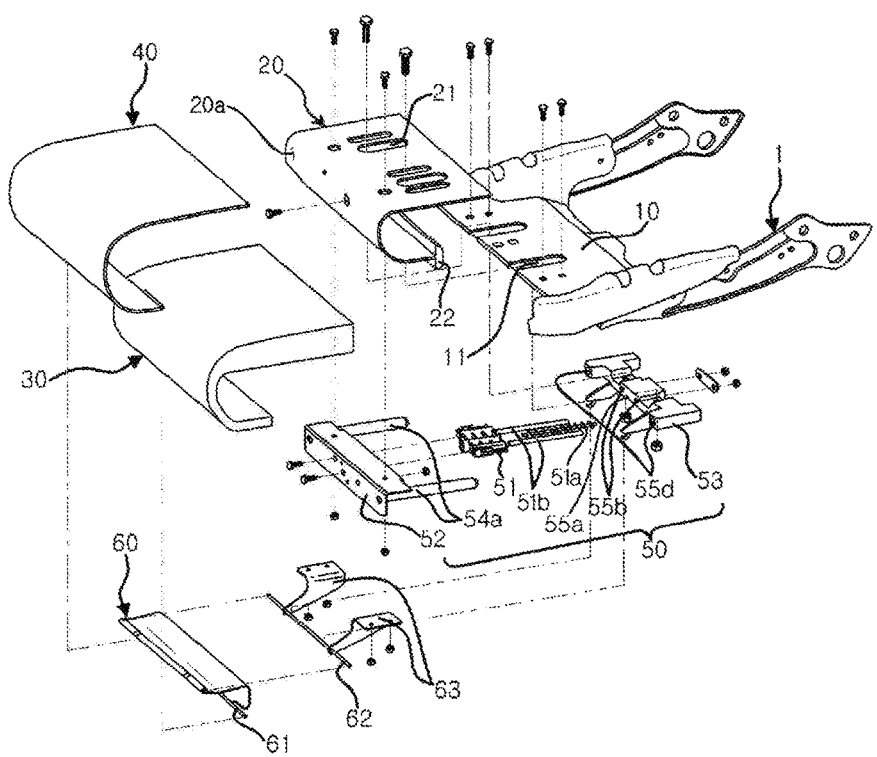
FIG. 2 is an exploded perspective assembly view of the occupant-support base of FIG. 1.

A first embodiment of an occupant-support base 12 in accordance with the present disclosure is shown in FIGS. 1 and 2. Occupant-support base 12 includes a support member 10 (also called seat pan 10) coupled to a seat frame 1 (also called seat pan 1), a carrying member 20 (also called a movable pad support 20), a cushion member 30 (also called a cushion 30), a cover member 40 (also called a cushion cover 40), a cover guide driving member 50 (also called a pad-support mover 50), and an extension cover member 60. Occupant-support base 12 further includes an adjusting device switch (not shown). The adjusting device switch may be located on a side surface to control an operation of cover guide driving member 50.

Occupant-support base 12 may be used for adjusting shapes and sizes of various portions of a vehicle seat. In one example, occupant-support base 12 may be used to adjust a width of a seat bottom as suggested in FIG. 7A, a width of a seat back as suggested in FIG. 7B, a height of a backrest as suggested in FIG. 7C, a height of a headrest as suggested in FIGS. 7D and 7E, a height of each lateral bolster included in a seat bottom as suggested in FIG. 7F, a height of each lateral bolster included in a backrest as suggested in FIG. 7G, and a length of an armrest as suggested in FIG. 7H.

Pad-extension system 14 includes support member 10, carrying member 20, and cover guide driving member 50. Support member 10 is configured to support cover member 40, carrying member 20, and cover guide driving member 50. Carrying member 20 is coupled to support member 10 to move forward and backward when adjusting the length and a front curved portion 20a for guiding the movement of cover member 40 and lower cover guides 22, 22a for guiding the movement of cover member 40. An end of cover member 40 is directly or indirectly connected to support member 10.

An end of cover member 40 is fixed directly to a rear end of support member 10 in a direct connection method of coupling cover member 40 to support member 10. An end of cover 40 is coupled indirectly to support member 10 by way of a cover connection member 61 and extension cover member 60 through connection of an extension cover fixing member 62, a third bracket 63, and a second bracket 53 in an indirect connection method.

Both sides of support member 10 are supported and fixed to the seat bottom frame or a seat back frame. In one example, support member 10 is supported by seat bottom frame 1 as shown in FIG. 2 to support cushion 30. One or more first guide holes 11 for guiding movement of carrying member 20 in a front and rear direction of cushion 30 when the length of seat bottom is adjusted are formed in support member 10. First guide holes 11 are formed to be spaced a predetermined distance from each other in a left and right direction at a central portion of a body of support member 10.

Figure 3A:
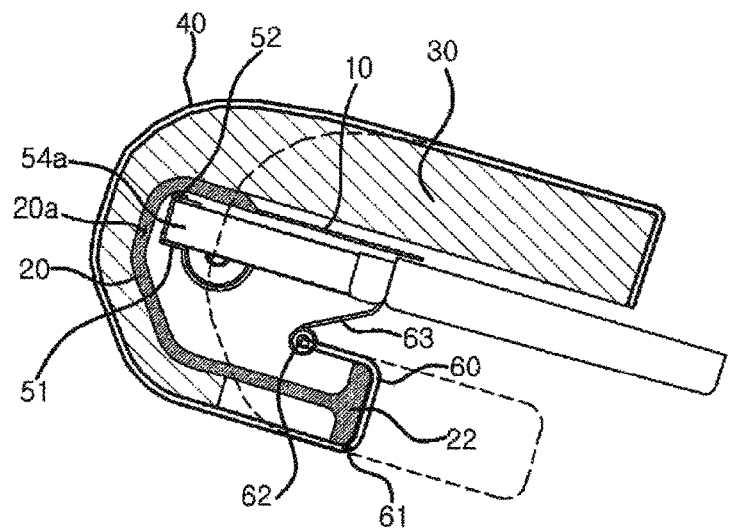
FIG. 3A is a side elevation view of the occupant-support pad of FIGS. 1 and 2 showing the occupant-support base in an expanded configuration as a result of the pad-extension system has caused the pad to extend in length.
Figure 3B:
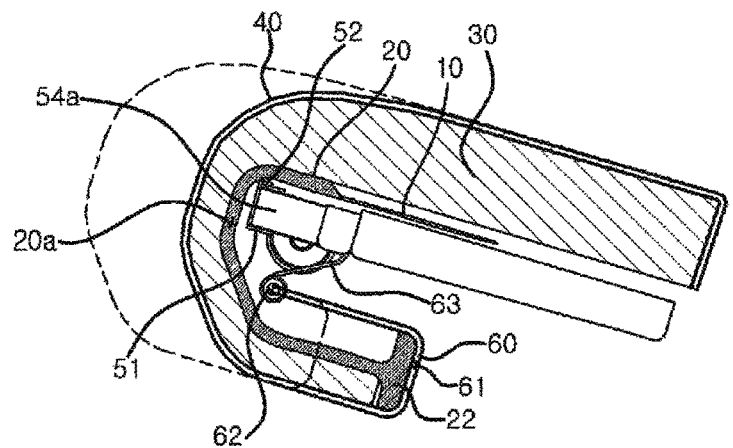
FIG. 3B is a view similar to FIG. 3A showing the occupant-support base in a retracted configuration as a result of the pad-extension system causing the pad to retract in length.
Figure 4A:
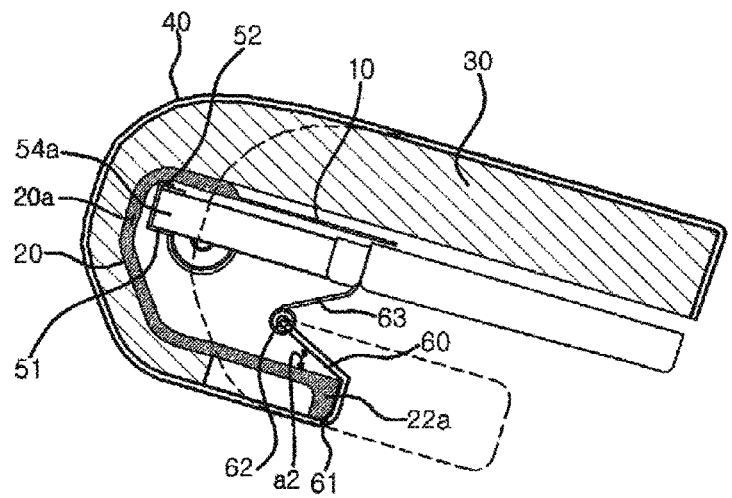
FIG. 4A is a side elevation view of another embodiment of an occupant-support base in accordance with the present disclosure showing the occupant-support base in the extended configuration as a result of the pad-extension system has caused the pad to extend in length.
Figure 4B:
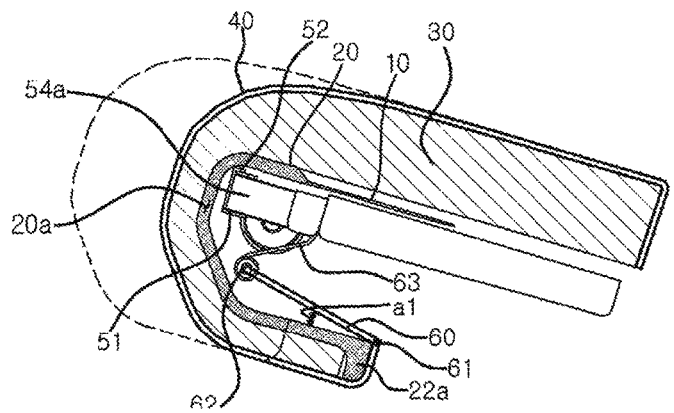
FIG. 4B is a view similar to FIG. 4A showing the occupant-support base in a retracted configuration as a result of the pad-extension system causing the pad to retract in length.

Carrying member 20 is seated and coupled to support member 10 to move in a length adjusting direction of cushion 30. A body of carrying member 20 has a C-shaped ring shape in a section. The body is flat so that cushion 30 or cover 40 is supported thereon. A front end of the body is curved downward and then rearward as shown in FIG. 2. Cover guides 22, 22a are formed on the extending end of the body and configured to allow cover 40 to be mounted thereon so as to support cover 40 and guide movement of cover 40. Cover guides 22, 22a may include a first cover guide 22 as shown in FIGS. 3A and 3B and a second cover guide 22a as shown in FIGS. 4A and 4B. First cover guide 22 forms a wing to both vertical sides of the end of the body. Second cover guide 22a forms a wing to only one side of upper and lower portions. A second guide hole 21 corresponding to the first guide hole 11 of support member 10 is formed in carrying member 20. Support member 10 and carrying member 20 may be coupled together to be movable in a front and rear direction in a state in which support member 10 and carrying member 20 overlap each other through overlapping of first guide hole 11 and second guide hole 21. In another example, support member 10 and carrying member 20 may be coupled together using a separate assembling member.

The body of cushion member 30 is formed of cushion foam for absorbing shocks and maximizing comfort of the occupant. The body of cushion member 30 has a C-shaped ring shape and a flat shape when viewed in section. The body of cushion member 30 has one end fixed to a rear end of support member 10 and the other end extending up to a position corresponding to cover guides 22, 22a in a shape corresponding to that of carrying member 20. The body of cushion member 30 is seated on and coupled to carrying member 20 so that the body is adjustable in length according to the length adjusting direction of the cushion.

Cushion member 30 covers an entire top surface of carrying member 20. The body of cushion member 30 has a relatively thin thickness at a side thereof that is wound along a lower portion of carrying member 20 when compared to a thickness at a side thereof that is fixed to the rear end of support member 10 as suggested in FIGS. 1 and 2. When the driver or occupant is seated, a support and comfort function may be provided by the thicker body disposed at the side of cushion member 30 that is fixed to the rear end of support member 10. The extension portion of cushion member 30 may be easily wound along the lower portion of carrying member 20 by the thinner body disposed at the side of the cushion member that is wound along the lower portion of carrying member 20. The tapered shape of cushion member 30 minimizes resistance to winding of cushion member 30 around and under carrying member 20.

Cushion member 30 may have thicknesses different from each other according to the positions and use thereof. Cushion member 30 is characterized in that the body at the side thereof that is bent and wound along the lower portion of carrying member 20 has a thickness less than that of the body at the side thereof that is fixed to the rear end of support member 10.

A body of cover member 40 has one end fixed to a rear end of support member 10 together with cushion member 30 and the other end extending up to a position corresponding to cover guides 22, 22a. The body of cover member 40 has a shape corresponding to that of carrying member 20 and is seated and fixed to carrying member 30 so that the body is adjustable in length according to the length adjusting direction of the cushion. Cover member 40 covers an entire top surface of carrying member 30. Cover member 40 is connected to extension cover member 60 as suggested in FIGS. 5A and 5B.

Cover guide driving member 50 may be a driving mechanism for moving carrying member 20 in the length adjusting direction of the cushion. In one example, cover guide driving member 50 includes a screw 51a, a movable member 51, a pair of screw guide rods 51b, a first bracket 52, a second bracket 53, a pair of cover guide rods 54a, and a pair of rod guide holes 55d. Movable member 51 is coupled to screw 51a that is rotated by the motor. Both ends of screw 51a are rotatably coupled to first bracket 52 and second bracket 53 and then respectively fixed to the inside of the front end of carrying member 20 and the lower portion of support member 10 by first bracket 52 and second bracket 53 to provide power for moving carrying member 20 in the length adjusting direction of the cushion supported by support member 10.

Screw 51a is rotatably coupled to the motor. In one example, screw 51a has a body having a length greater than a length that is adjustable in the front and rear direction of the cushion. Both ends of screw 51a are rotatably fixed by first bracket 52 and second bracket 53, respectively.

Movable member 51 is coupled to screw 51a to move linearly forward or backward along the screw due to the rotating operation of screw 51a. An end of a front end side of movable member 51 is fixed to first bracket 52 by using one or more bolts.

The pair of screw guide rods 51b pass through the body of movable member 51 and are assembled in a state in which the screw guide rods are disposed parallel to each other on both sides of screw 51a to guide the movement of movable member 51 and support movable member 51. The screw guide rod has both ends respectively fixed to first bracket 52 and second bracket 53.

First bracket 52 is coupled with the inside of the front end of carrying member 20 by separately using one or more bolts. Movable member 51 and an end of a front end side of each of the pair of screw guide rods 51b are coupled to each other.

Second bracket 53 is coupled to the lower portion of support member 10 by separately using one or more bolts. A screw guide hole 55a and a pair of rod assembly holes 55b are formed parallel to each other in both sides of the screw guide hole are formed so that screw 51a and ends of rear sides of the pair of screw guide rods 51b are respectively inserted to support movably the second bracket in the length adjusting direction of the seat bottom.

The pair of cover guide rods 54a are installed to reinforce an operation force for carrying member 20 by first bracket 52 when first bracket 52 is pushed forward by movable member 51 to allow carrying member 20 to operate in a forward direction. The pair of cover guide rods are coupled to both sides of the fixed portion of movable member 51 of first bracket 52 in a vertical direction with respect to first bracket 52.

The pair of rod guide holes 55d are formed to guide movement of pair of cover guide rods 54a in the front/rear direction by inserting the ends of the rear sides of the pair of cover guide rods 54a therein. Pair of rod guide holes 55d are formed in second bracket 53 at positions respectively corresponding to pair of cover guide rods 54a to allow pair of cover guide rods 54a to be supported and guided forward and backward.

Cover guide driving member 50 includes first bracket 52 installed inside carrying member 20 and movable member 51 connected to first bracket 52 to move forward or backward. Cover guide driving member 50 includes second bracket 53 connected to the lower portion of support member 10. Cover guide driving member 50 includes pair of screw guide rods 51b connected to second bracket 53 to support and guide movable member 51. First bracket 52 includes pair of cover guide rods 54a and pair of cover guide rods 54a are supported and guided by second bracket 53. Second bracket 53 includes pair of rod guide holes 55d formed to guide pair of cover guide rods 54a.

Extension cover member 60 is connected between an extension cover fixing member 62 that is located at one regular point inside carrying member 20 and cover member 40 by third bracket 63. Extension cover member 60 has one end connected to the extending end of cover member 40 through cover connection member 61 and the other end connected to extension cover fixing member 62 that is supported and fixed at the one regular point by third bracket 63. Extension cover member 60 is arranged to surround the inside of cover guides 22, 22a of carrying member 20. Extension cover member 60 and cover member 40 are coupled to each other by cover connection member 61 or connected to each other through sewing after the extension cover member and the cover member contact each other.

FIGS. 3A and 3B show an example of an operation for extending or retracting the length of the occupant-support base. An initial state of the occupant-support base before extending the pad of the occupant-support base as suggested in FIG. 3A. When in the initial state, cover member 40 and extension cover member 60 are wound around first cover guide 22 of carrying member 20 and wound and fixed into the seat before cover guide driving member 50 moves forward. A dotted line portion represents a state in which the seat extends and a solid line portion represents an original length of the seat. An extended state of the occupant-support base after extending the pad of the occupant-support base is suggested in FIG. 3B. As cover guide driving member 50 moves forward, carrying member 20 moves to a front side of the seat, and thus, cover member 40 and extension cover member 60, which are wound around first cover guide 22, are unwound forward from the inside of the seat. As a result, cushion member 30 is expanded in volume to allow the seat to extend in total length by cover member 40. A solid line portion represents the extended state and the dotted line portion represents an original initial state of the seat as shown in FIG. 3B.

First, as shown in FIG. 3A, in the normally assembled state, second bracket 53 of cover guide driving member 50 is coupled to the lower portion of support member 10 in a fixed position. When the switch is engaged to drive the motor of cover guide driving member 50 so as to extend the length of the seat, screw 51a is rotated forward to allow the movable member 51 to move forward. As a result, the movable member is supported and guided by the pair of screw guide rods 51b and the pair of cover guide rods 54a as first bracket 52 to which movable member 51 is coupled to is pushed forward.

Cover guide driving member 50 causes carrying member 20 to be pushed forward by first bracket. As carrying member 20 is pushed forward, the front end of cushion member 30 that covers the entire surface of carrying member 20 is pushed forward together with carrying member 20. The front end of cover member 40 that covers the entire surface of cushion member 30 is pushed forward together with carrying member 20 and cushion member 30. The end extending from the front end of cover member 40 is coupled to extension cover member 60 which is fixed at the one regular position inside carrying member 20 by extension cover fixing member 62 and third bracket 63 through cover connection member 61, carrying member 20 and cushion member 30 may move forward by a desired length as illustrated in FIG. 3A in the state in which carrying member 20 and cushion member 30 are supported by cover member 40, extension cover member 60, and cover connection member 61.

When the motor of cover guide driving member 50 is driven to reduce the length of the seat as a result of engaging the switch, rotation of screw 51a is reversed to cause movable member 51 to move backward in a manner in which the movable member is supported and guided by pair of screw guide rods 51b and pair of cover guide rods 54a, and thus, first bracket 52 to which movable member 51 is coupled to is pushed backward as suggested in FIG. 3B. As cover guide driving member 50 moves backward, carrying member 20 is pushed backward by first bracket 52. First cover guide 22, formed on the extending end of carrying member 20, pushes cover member 40, extension cover member 60, and cover connection member 61 backward. As a result, carrying member 20 and the front end of cover member 40 that covers the entire surface of cushion member 30 are pushed backward together with each other. Carrying member 20 and cushion member 30 may move backward as shown in FIG. 3B because the end extending from the front end of cover member 40 is connected to extension cover member 60 that is located at the one regular position inside carrying member 20 by extension cover fixing member 62 and third bracket 63 through the cover connection member 61.

When first bracket 52 mounted on the cover guide driving member 50 moves forward, the seat bottom increases in length by an unwinding operation of extension cover member 60. As a result, a distance between first cover guide 22 and extension cover fixing member 62 is reduced while carrying member 20 or the curved portion of the carrying member is pushed forward. When first bracket 52 mounted on cover guide driving member 50 moves backward, the seat bottom is reduced in length by a winding operation of extension cover member 60. As a result, the distance between first cover guide 22 and extension cover fixing member 62 increases while first cover guide 22 connected to the lower end of carrying member 20 is pushed backward.

Carrying member 20 includes first cover guide 22 of which the end of the body that is curved downward to extend is arranged to extend again to both vertical sides to form the ring shape on both vertical sides as shown in FIGS. 3A and 3B. Carrying member 20 may move by a half or less of the total moving distance of cover member 40 when the front and rear length of the seat bottom is adjusted.

FIGS. 4A and 4B are views showing an example of an operation for extending or restoring the length of the seat embodied as an occupant-support base in accordance with the present disclosure. In this example, carrying member 20 includes a second cover guide 22a having a single wing. Carrying member 20 may include second cover guide 22a of which an end of a body extends to only one side and only the ring shape is formed toward the lower side as an example of upper and lower portions cooperating to form the ring shape toward only the one side as shown in FIGS. 4A and 4B. Second cover guide 22a has the ring shape toward only the one side and generates an angle a1 between second cover guide 22a and extension cover member 60 of which an end of one side is fixed by extension cover fixing member 62 in a state in which the length of the seat is adjusted to the rear side as shown in FIG. 4A and generates an angle a2 in a state in which the length of the seat is adjusted to the front side as shown in FIG. 4B. If an angle between extension cover member 60 and each of cover guides 22, 22a is generally defined as an angle $\alpha$, carrying member 20 may move by $0.5*\cos(\alpha)$ times with respect to the total moving distance of cover member 40 when the front and rear length of the seat bottom is adjusted.

The cushion and the cover which are integrated with each other so that the cushion and the cover are wound along the lower portion of the carrying member without separating from one another. Together the cushion and cover cooperate to establish a pad.

In another illustrative embodiment, an occupant-support base may one or more lateral finishing covers that cover a laterally exposed space exposed to the side surface of the seat when cover member 40 moves forward or backward to neatly finish the seat. The various embodiments of the lateral finishing cover are illustrated in FIGS. 5A and 5B and FIGS. 6A and 6B.

As show in FIGS. 5A-6B, an occupant-support base in accordance with the present disclosure includes a carrying member 20 that includes a first cover carrying member 210 and a second cover carrying member 220 which are separately provided and successively movable forward or backward by a cover guide driving member 50. First cover carrying member 210 and second cover carrying member 220 may move forward when moved forward by cover guide driving member 50 so that bodies of the two members 210, 220 overlap each other at a front end. When moving backward, the two members 210, 220 may be separated from each other in a reverse order opposite to that of the forward movement to move backward.

First cover carrying member 210 has a front curved portion to push a cushion member 30 and a cover member 40 forward while moving forward along the forward direction and has a C-shaped ring when viewed in section of the body thereof. The body has a flat top surface and a front end of the body is curved and then curved to a rear side of the body. Cover guides 22, 22a are formed on the extending end of the body. In first cover carrying member 210, a first lateral finishing cover 211 has a C-shaped ring. First lateral finishing cover 211 covers a lateral empty space exposed to both left and right sides of cover member 40 when moving forward and guides the forward and backward movement of second cover carrying member 220. The C-shaped ring is vertically disposed along an edge of the body on both left and right sides of first cover carrying member 210. A second lateral finishing cover outer guide rail 211a is shown in FIGS. 5A and 5B. Second lateral finishing cover outer guide rail 211a is configured to guide forward or backward operation of second cover carrying member 220 along an outer circumference of an edge of the cover.

A second lateral finishing cover inner guide 211b is shown in FIGS. 6A and 6B. The second lateral finishing cover inner guide 211b is configured to guide the forward or backward operation of second cover carrying member 220 along an inner circumference of the edge of the cover and is disposed on an edge of first lateral finishing cover 211.

Second cover carrying member 220 has a body with a size less than that of first cover carrying member 210 so that second cover carrying member 220 is inserted into the body having the C-shaped ring of first cover carrying member 210 when moving forward. Second cover carrying member 220 is seated on a support member 10 so that second cover carrying member 220 together with first cover carrying member 210 successively moves forward or backward in a reverse order by a cover guide driving member 50.

In the second cover carrying member 220, a second lateral finishing cover 221 added to first lateral finishing cover 211 of first cover carrying member 210 to secondarily cover the lateral empty space again when moving forward is on each of both left and right sides of the body. A traveling blade 221a travels along second lateral finishing cover outer guide rail 211a or second lateral finishing cover inner guide rail 211b disposed along the circumference of the edge of first cover carrying member 210 is disposed on an edge of the second lateral finishing cover 221. When moving forward or backward, the second cover carrying member may move forward or backward along the outside or inside of the circumference of the edge of the first lateral finishing cover 211. In second cover carrying member 220 having the above-described configuration, traveling blade 221a of second lateral finishing cover 221 is guided along guide rail 211 or 211b disposed on the edge of first lateral finishing cover 211 and coupled to first cover carrying member 210 in a sliding arrangement. The second cover carrying member may overlap the first cover carrying member or be separated from the first cover carrying member.

The lateral empty space exposed to both left and right sides of cover member 40 is primarily covered when first lateral finishing cover 211 of first cover carrying member 210 moves forward when the seat is moved forward by cover guide driving member 50. Traveling blade 221a, disposed on the edge of second lateral finishing cover 221 of second cover carrying member 220, is supported and guided by second lateral finishing cover outer guide rail 211a or second lateral finishing cover inner guide rail 211b, disposed on the edge of first lateral finishing cover 211 of first cover carrying member 210, to allow second cover carrying member 220 to travel forward. Second lateral finishing cover 221 of second cover carrying member 220 may secondarily and neatly cover the lateral empty space remaining in a center of first lateral finishing cover 211 of first cover carrying member 210.

Therefore, in the device for adjusting the seat according to another embodiment of the present invention, the length of the seat bottom may be adjusted to meet the body conditions of the occupant, and also the laterally exposed space that may occur when the length is adjusted may be neatly finished.

The occupant-support base may be embodied as a seat backrest, a headrest, a seat bottom lateral bolster, a backrest lateral bolster, an armrest, and the like as well as a seat bottom. These various embodiments are shown in FIGS. 7A to 7H, respectively. As shown in FIGS. 7A-7H, the occupant-support base may be used as devices for adjusting a left and right width of the seat bottom as shown in FIG. 7A, a left and right width of the seat backrest as shown in FIG. 7B, a height of the seat backrest as shown in FIG. 7C, a height of the headrest as shown in FIGS. 7D and 7E, a height of the seat bottom lateral bolster as shown in FIG. 7F, a height of the backrest lateral bolster as shown in FIG. 7G, and a length of an armrest as shown in FIG. 7H.

An occupant-support base in accordance with the present disclosure may include one or more pad-extension systems as shown in FIG. 7A. When pad-extension systems are installed on each of both left and right sides of the seat bottom, a front curved portion 20a is installed in a pair to face the outside of the seat from both left and right ends of the pad so that carrying member 20 moves forward to the outside of the seat bottom from each of both left and right ends of the seat bottom to extend a width of cover member 40 in both left and right directions. Furthermore, when carrying member 20 moves forward or backward in a state in which cover member 40 surrounds cushion member 30 by interposing cushion member 30 into cover member, both left and right ends of the pad are connected to extension cover member 60 so that the left and right ends are supported and guided by front curved portion 20a and lower cover guides 22, 22a and are unwound outward or wound inward.

When the pad-extension system is installed on only one side of both left and right ends of the pad, front curved portion 20a is installed to face the outside of the one left or right side of the seat bottom so that carrying member 20 moves forward to the outside of the seat from the one left or right end of the seat bottom to extend a width of cover member 40 in one left or right direction. Furthermore, cover member 40 has one end at which carrying member 20 is not installed fixed to a rear end of support member 10 together with cushion member 30 and the other end extending up to a position corresponding to each of cover guides 22, 22a of carrying member 20 in the state in which the cover member surrounds cushion member 30 by interposing the cushion member therein. Cover member is connected to extension cover member 60.

When the occupant-support base is embodied as a device for adjusting the width of the seat backrest as shown in FIG. 7B, a pad-extension system may be installed on each of both left and right sides of the seat backrest to extend or restore a length to both sides from both left and right ends of the seat backrest, thereby adjusting the total width of the seat backrest. In another example, the pad-extension system may be installed on one left or right side of the seat backrest to extend or restore a length to one side from one left or right end of the seat backrest, thereby adjusting the total width of the seat backrest.

When the occupant-support base is embodied as a device for adjusting the height of the seat backrest as shown in FIG. 7C, the pad-extension system may be installed to stand up on an upper portion of the seat backrest so that the length is extended or restored upward from an upper end of seat backrest 3 to adjust the total height of seat backrest 3. In this embodiment, cushion member 30 and cover member 40, which constitute the body of the device for adjusting the vehicular seat, may be realized as separate members that are separated from one another which constitute the body of seat backrest 3.

When the occupant-support base is embodied as a device for adjusting the height of headrest 5 as shown in FIG. 7D, the pad-extension system may be indirectly fixed and installed on an upper end of seat backrest 3 by using a separate support 4 as a medium so that the pad-extension system is spaced apart from an upper body of seat backrest 3. As shown in FIG. 7E, the body that is supported and guided by cover guides 22, 22a of carrying member 20 may be directly installed on the upper end of seat backrest 3 so that the body supports a head of the driver or occupant in a state in which the body is spaced upward from the upper end of seat backrest 3. Here, the front and rear positions of the body may be reversely installed so that the body is directly installed on the upper portion of the seat backrest. The pad-extension system may be installed to directly support the head of the occupant by cover member 40 having a long length or extension cover member 60 having a short length. The pad-extension system may be installed so that the total height of the headrest may be extended when carrying member 20 moves forward and be restored when carrying member 20 moves backward.

When the occupant-support base is embodied as a device for adjusting the height of the seat bottom lateral bolster 6 as shown in FIG. 7F, the pad-extension system may be installed so that the length is extended or restored upward from an upper end of seat bottom lateral bolster 6 to adjust the total height of seat bottom lateral bolster 6. The pad-extension system in the seat bottom lateral bolster may be integrally installed with the seat bottom at a left or right side or both sides of the seat bottom so that the length in a diagonal direction of seat bottom lateral bolster 6 installed on seat bottom 2 may be extended or restored to adjust the height of the seat bottom lateral bolster.

When the occupant-support base is embodied as a device for adjusting the height of backrest lateral bolster 7 as shown in FIG. 7G, the pad-extension system may be installed so that the length is extended or restored upward from an upper end of backrest lateral bolster 7 to adjust the total height of backrest lateral bolster 7. The pad-extension system in backrest lateral bolster 7 may be integrally installed with seat backrest 3 at a left side, a right side, or both the left side and the right side of the seat backrest so that the length in a diagonal direction of backrest lateral bolster 7 installed on seat backrest 3 may be extended or restored to adjust the height of the backrest lateral bolster.

The occupant-support base may be embodied as a device for adjusting the length of armrest 8 as shown in FIG. 7H. The pad-extension system may be installed so that the length is extended or restored forward from a front end of armrest 8 to adjust the total length of armrest 8.

Another embodiment of an occupant-support base 310 in accordance with the present disclosure is shown in FIG. 8. Occupant-support base 310 is embodied as a seat bottom 310 and adapted for use in a vehicle seat as suggested in FIG. 8. Occupant-support base 310 illustratively includes a seat pan 312, a pad 313 coupled to seat pan 312, and a pad-extension system 314 coupled to seat pan 312. Pad-extension system 314 is configured to change a size of pad 313 by moving a portion of pad 313 between a retracted configuration shown in FIG. 10 and an expanded configuration shown in FIG. 11. Occupant-support base 310 may be used as a seat bottom, a backrest, a headrest, a bolster included in a backrest or seat bottom, an armrest, or any combination thereof.

Pad-extension system 314 changes the length of pad 313. In one example length is measure between a back side 321 and a front side 322 of occupant-support base 310 as suggested in FIGS. 10 and 11. Pad-extension system 314 includes a pan mount 316, a movable pad support 318, and a pad-support mover 320 as shown, for example, in FIG. 9. Pan mount 316 is coupled to seat pan 312 of seat bottom 310 in a fixed position relative to seat pan 312. Movable pad support 318 is coupled to pan mount 316 to slide relative to mount 316 when pad-extension system 314 moves between the retracted configuration and the expanded configuration. Pad-support mover 320 is located between pan mount 316 and movable pad support 318 and is configured to move movable pad support 318 relative to pan mount 316.

In one illustrative embodiment, pad-support mover 320 is a pneumatic inflatable bladder 324 adapted to push movable pad support 318 away from pan mount 316 when pneumatic inflatable bladder 324 is inflated as suggested by arrow 324A shown in FIG. 11. By pushing movable pad support 318 away from pan mount 316, pad-support mover 320 moves pad-extension system 314 from the retracted configuration to the expanded configuration.

Pad-extension system 314 further includes return springs 328, 329. Return springs 328, 329 are arranged between pan mount 316 and movable pad support 318 and are arranged to bias movable pad support 318 toward pan mount 316 when the pneumatic inflatable bladder 324 is deflated. Return springs 328, 329 move pad-extension system 314 from the expanded configuration to the retracted configuration by pulling movable pad support 318 toward the pan mount 316.

Pad 313 is arranged to extend over a top side 333 and a front side 332 of movable pad support 318 when pad-extension system 314 is in both the retracted and expanded configuration without forming a gap in an outer pad surface 323 of pad 313. Pad 313 includes a gapless cushion cover 330, a cushion 331, and a slack compensator 338 as shown in FIGS. 13 and 14. In the example where occupant-support base 310 is a seat bottom, cushion cover 330 and cushion 331 extend over pad-extension system 314 to support the legs of an occupant supported by occupant-support base 310 as pad-extension system 314 moves between the retracted configuration and the expanded configuration. Slack compensator 338 is coupled to cushion cover 330 to control wrinkles in cushion cover 330 as pad-extension system 314 moves between the retracted configuration and the expanded configuration.

Cushion cover 330 may be made from cloth, leather, or any other suitable alternative or combinations. Cushion cover 330 has a fixed anchor point 341 and an adjustable end 342 as shown in FIGS. 10 and 11. Anchor point 341 is fixed in place relative to seat pan 312 and pan mount 316. Adjustable end 342 slides along movable pad support 318 of pad-extension system 314 as pad-extension system 314 moves between configurations. Adjustable end 342 is coupled to pan mount 316 by a number of slip belts 344 as suggested by arrow 336A in FIG. 11.

When pad-extension system 314 is in the retracted configuration, cushion cover sheet 330 extends a first distance d1 underneath movable pad support 318 while it also extends over front side 332 and top side 333 of movable pad support 318 as shown in FIG. 10. When pad-extension system 314 is in the expanded configuration, cushion cover 330 slides along movable pad support 318 so that it extends a second distance d2, smaller than the first distance d1, underneath movable pad support 318 while continuing to extend over front side 332 and top side 333 of movable pad support 318 as shown in FIG. 11. Cushion cover 330 extends over top side 333 and front side 332 of movable pad support 318 when pad-extension system 314 is in both the retracted and expanded configuration without forming a gap along outer pad surface 323 of pad 313 in which crumbs or other dirt might be trapped.

Slack compensator 338 includes, for example, a left compensator system 346 arranged along a left side 325 of occupant-support base 310 and a right compensator system 348 arranged along a right side 326 of occupant-support base 310 as shown in FIG. 9. Each compensator system 346, 348 is substantially similar to the other and each includes a plurality of clips 350, 351, a wire 352, 353, and a tension spring 354, 355. For ease of description, only left compensator system 346 is further described but the following description applies to both left and right compensator systems 346, 348.

Clips 350 of left compensator system 346 are coupled to cushion cover 330 along a side 336S of cushion cover 330. Each clip 350 is formed to include an eyelet 355 sized to receive wire 352 as shown in FIG. 9. Wire 352 of left compensator system 346 is fixed at a first end 3521 to movable pad support 318 and extends through eyelets 355 of clips 350 along side 336S of cushion cover 330 to tension spring 354 where a second end 3522 of wire 352 is attached to tension spring 354. Tension spring 354 extends from wire 352 to an attachment flange 356 included in pan mount 316 as shown in FIG. 8. When pad-extension system 314 moves between retracted and expanded configurations, clips 350 move with cushion cover 330 and slide along wire 352. Tension spring 354 maintains tension in the wire 352 as pad-extension system 314 moves between the retracted and the expanded configurations. Tension spring 354 also allows movement of clips 350 and wire 352 with cushion cover 330 as pad-extension system 314 moves from the retracted to the expanded configuration such that compensator system 346 is lengthened when pad-extension system 314 is in the expanded configuration.

Pan mount 316, sometimes called a substrate, is a monolithic component formed to include a pan-mount panel 360, a face panel 362, lower rails 364, and upper rails 366 as shown in FIG. 9. Pan-mount panel 360 is generally horizontal and is fixed to seat pan 312 as suggested in FIGS. 8, 10, and 11. Face panel 362 extends upwardly and downwardly from pan mount panel 360 and provides a surface for pad-support mover 320 to push against when moving movable pad support 318 relative to pan mount 316. Lower rails 364 extend rearwardly from face panel 362 below seat pan 312 and are received in corresponding lower guide tracks 374 formed in movable pad support 318 as shown in FIG. 13. Upper rails 366 extend rearwardly from face panel 362 above seat pan 312 and are received in corresponding upper guide tracks 376 formed in movable pad support 318 as shown in FIG. 13. Rails 364, 366 and guide tracks 374, 376 cooperate to control movement of movable pad support 318 as it slides relative to pan mount 316.

Movable pad support 318 moves relative to seat pan 312 from a first position near seat pan 312 when pad-extension system 314 is in the retracted configuration to a second position further away from the seat pan 312 when extension system is in the expanded configuration as shown in FIGS. 10 and 11. Movable pad support 318 is, for example, a monolithic component formed to include a forward body 370, a lower platform 371, and an upper platform 372 as shown in FIG. 9. Forward body 370 provides front side 332 of movable pad support 318 and is pushed away from pan mount 316 by pad-support mover 320 as suggested in FIG. 11. Lower platform 372 extends rearwardly from forward body 370 to provide bottom side 334 of movable pad support 318 and includes lower guide tracks 374. Upper platform 372 extends rearwardly from forward body 370 to provide top side 333 of movable pad support 318 and includes upper guide tracks 376. In the illustrative embodiment, at least a portion of pan mount 316, including face panel 362 of the pan mount 316, is received by movable pad support 318 between lower platform 371 and upper platform 372 as shown in FIGS. 8, 10, and 11.

Movable pad support 318 also includes return arms 381, 382 arranged to extend rearwardly and downwardly from upper platform 372 to a location rearward of face panel 362 included in pan mount 316 as suggested in FIG. 9. Return springs 328, 329 that pull movable pad support 318 toward pan mount 316 when pad-support mover 320 is deflated are illustratively compression springs located between return arms 381, 382 and face panel 362 of pan mount 316. In some embodiments, return springs 328, 329 may be tension springs or other biasing members arranged in other ways to return movable pad support 318 toward pan mount 316 when pad-extension system 314 is moved to the retracted configuration. Illustratively, return springs 328, 329 are arranged inboard of guide rails 364, 366 and of compensator assemblies 346, 348 such that they are housed within pad-extension system 314.

In another example, cushion 331 is a tapered foam pad as shown in FIGS. 14 and 15. Tapered foam pad 331 is arranged under cushion cover 330 of pad 313 and over pad-extension system 314 such that tapered foam pad 331 cushions a user sitting on occupant-support base 310. Tapered foam pad 331 illustratively includes a relatively-thick section 391 and a relatively-thin section 392.

When pad-extension system 314 is in the retracted configuration, relatively-thick section 391 of tapered foam pad 331 extends over top side 333 of movable pad support 318 and extends a third distance d3 along front side 332 of movable pad support 318 as shown in FIG. 14. Relatively-thin section 392 extends from relatively-thick section 391 along the rest of front side 332 of movable pad support 318 and along bottom side 334 of movable pad support 318.

When pad-extension system 314 is in the expanded configuration, relatively-thick section 391 of tapered foam pad 331 remains over top side 333 of movable pad support 318 and extends a fourth distance d4, less than third distance d3, along front side 332 of the movable pad support 318 as shown in FIG. 15. Relatively-thin section 392 extends from relatively-thick section 391 along the rest of front side 332 of movable pad support 318 and along bottom side 334 of movable pad support 318.

In the example where occupant-support base 310 is a seat bottom, relatively-thick portion 391 of tapered foam pad 331 underlies the bottom and thighs of the occupant both when the pad-extension system 314 is in the retracted and the expanded configuration as a result of the shape and the movement of tapered foam pad 331. By arranging relatively-thick portion 391 of tapered foam pad 331 under the occupant, downward force applied by the occupant is substantially cushioned by relatively-thick portion 391 of tapered foam pad 331. The remaining front and bottom surfaces 332, 334 of movable pad support 318 that may be contacted by the occupant are also cushioned by relatively thin portion 392 of tapered foam pad 331 while the pad-extension system 314 is in the retracted and the expanded configuration.

Optional left and right side covers may also be included in cushion cover 330 to block a user from accessing pad-extension system 314 from left and right sides 325, 326 of occupant-support base 310. Each side cover may include an aft panel coupled to seat pan 312 and a forward panel coupled to movable pad support 318 to slide with movable pad support 318 relative to seat pan 312 and the aft panel. The aft panel and the forward panel may cooperate to block access to pad-extension system 314 from left and right sides 325, 326 of occupant-support base 310 while pad-extension system 314 is in the retracted and the expanded configuration.

In some embodiments, the side covers may each include a stretchable sheet in place of, or in addition, to the aft and the forward panels. The stretchable sheet may be coupled to seat pan 312 and movable pad support 318 such that the fabric is relaxed when pad-extension system 314 is in the retracted configuration and is stretched when pad-extension system 314 is in the expanded configuration. The stretchable sheet may be sized to block access to pad-extension system 314 from the left and the right sides of occupant-support base 310 while pad-extension system 314 is in the retracted and the expanded configuration. In other embodiments, various other mechanisms may provide side covers that block access to pad-extension system 314 from the left and the right sides of occupant-support base 310.

In one example, occupant-support base 310 is embodied as a seat bottom. However, it is within the scope of the present disclosure for occupant-support base 310 to be embodied as a seat back, a headrest, one more seat back bolsters, one or more seat bottom bolsters, or any combination thereof.

An occupant-support base in accordance with the present disclosure is configured to vary in dimension or shape at the option of the user. The occupant-support base varies in size and shape while providing for an uninterrupted upper surface of the pad while blocking access to laterally exposed spaces that may be formed when the occupant-support base moves from a retracted configuration to an expanded configuration.

An occupant-support base in accordance with the present disclosure includes a cover guide driving member for moving a movable member forward or backward and an extension cover member for extending a length of a cover member. The extension cover member having one end connected to a third bracket of a support member. When a first bracket mounted on the cover guide driving member moves forward, a carrying member is pushed forward and the extendable portion of the seat increases in length by an unwinding operation of the extension cover member by which a distance between a first cover guide or a second cover guide and an extension cover fixing member decreases. When the first bracket mounted on the cover guide driving member moves backward, the first cover guide or the second cover guide, which is connected to a lower end of the carrying member is pushed backward and the extendable portion of the seat decreases in length by a winding operation of the extension cover member, by which the distance between each of the cover guides and the extension cover fixing member increases.

The carrying member may have a C-shaped ring when viewed in section to reduce a driving distance of the cover guide driving member and an actual seat bottom adjusting length by an operation by which the cushion member and the cover member are wound inside the carrying member when the seat bottom is adjusted in length. The carrying member may include a flat body so that the cushion or the cover is seated thereon and a front end of the flat body may be curved downward and the extending end may be curved again to a rear side of the body. In some embodiments, the carrying member may include one or more lateral finishing covers for covering and finishing a lateral empty space that is exposed when the cover member is extended.

The invention claimed is:

1. An occupant-support base comprises
   a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan,
   a pad coupled to the seat pan and adapted to be located between the seat pan and an occupant, the pad including an outer pad surface arranged to face away from the seat pan and an inner pad surface arranged to face toward the seat pan, and
   a pad-extension system configured to provide means for moving a portion of the pad relative to the seat pan between a retracted configuration in which the pad has a first dimension measured between the perimeter surface of the seat pan and a portion of the inner pad surface which confronts the perimeter surface of the seat pan and an extended configuration in which the pad has a relatively greater second dimension measured between the perimeter surface of the seat pan and the portion of the inner pad surface without causing a gap to be formed in a portion of the outer pad surface of the pad during movement from the retracted configuration to the extended configuration
   wherein the pad-extension system includes a pan mount coupled to the seat pan in a fixed position, a movable pad support coupled to the pan mount to move relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable pad support to cause the movable pad support to move relative to the pan mount
   wherein the pad includes a cushion cover located in spaced-apart relation to the seat pan, a cushion located between the cushion cover and the seat pan, and an extension cover member having a first end coupled to an adjustable end of the cushion cover and a second end coupled to the pan mount in a fixed position, and
   wherein the pad-support mover includes a first bracket coupled to the movable pad support and arranged to move in a first direction to cause the movable pad support to move in the first direction to cause the extension cover member to unwind and establish the expanded configuration so that a distance between a first cover guide and an extension cover fixing member decreases, arranged to move in a second direction opposite the first direction to cause the movable pad support to move in the second direction to cause the extension cover member to windup and establish the retracted configuration so that a distance between the first cover guide and the extension cover fixing member increases, and wherein the movable pad support moves by up to about half of a distance the pad moves during movement between the retracted and extended configurations.

2. The occupant-support base of claim 1, wherein the movable pad support moves by $0.5*\cos(\alpha)$ where $\alpha$ is an angle formed between the extension cover member and the first cover guide.

3. The occupant-support base of claim 1, wherein the pad-extension system further comprises a first bracket coupled to movable pad support in a space formed in the movable pad support and a second bracket coupled to an inner surface of the pan mount to extend away from the outer surface of the pan mount and the pad-support mover includes a pair of guide rods coupled to the second bracket to support guide the movable pad support during movement of the movable pad support.

4. The occupant-support base of claim 3, wherein the first bracket includes a pair of cover guide rods arranged to extend into a pair of rod guide holes formed in the second bracket.

5. The occupant-support base of claim 1, wherein the pad-extension system further includes a lateral finishing cover arranged to extend between and interconnect the pan mount and the movable pad support during movement of the movable pad support from the retracted configuration to the extended configuration to block access to a space exposed to a side of the movable pad support and formed as the movable pad support moves away from the pan mount.

6. The occupant-support base of claim 5, wherein the movable pad support includes a first support member and a second support member coupled to the first support member to move relative to the first support member.

7. An occupant-support base comprises
   a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan,
   a pad coupled to the seat pan and adapted to be located between the seat pan and an occupant, the pad including an outer pad surface arranged to face away from the seat pan and an inner pad surface arranged to face toward the seat pan, and
   a pad-extension system configured to provide means for moving a portion of the pad relative to the seat pan between a retracted configuration in which the pad has a first dimension measured between the perimeter surface of the seat pan and a portion of the inner pad surface which confronts the perimeter surface of the seat pan and an extended configuration in which the pad has a relatively greater second dimension measured between the perimeter surface of the seat pan and the portion of the inner pad surface without causing a gap to be formed in a portion of the outer pad surface of the pad during movement from the retracted configuration to the extended configuration wherein the pad-extension system includes a pan mount coupled to the seat pan in a fixed position, a movable pad support coupled to the pan mount to move relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable pad support to cause the movable pad support to slide relative to the pan mount wherein the pad-support mover is a pneumatic actuator including an inflatable bladder.

8. The occupant-support base of claim 7, wherein the pad includes a cushion cover located in spaced-apart relation to the seat pan and a cushion located between the cushion cover and the seat pan.

9. The occupant-support base of claim 8, wherein the cushion cover includes a fixed end located in a fixed position relative to the seat pan and an adjustable end located in spaced-apart relation to the fixed end and configured to move in response to movement of the movable pad support.

10. An occupant-support base comprises
a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan, a pad coupled to the seat pan and adapted to be located between the seat pan and an occupant, the pad including an outer pad surface arranged to face away from the seat pan and an inner pad surface arranged to face toward the seat pan, and a pad-extension system configured to provide means for moving a portion of the pad relative to the seat pan between a retracted configuration in which the pad has a first dimension measured between the perimeter surface of the seat pan and a portion of the inner pad surface which confronts the perimeter surface of the seat pan and an extended configuration in which the pad has a relatively greater second dimension measured between the perimeter surface of the seat pan and the portion of the inner pad surface without causing a gap to be formed in a portion of the outer pad surface of the pad during movement from the retracted configuration to the extended configuration wherein the pad-extension system includes a pan mount coupled to the seat pan in a fixed position, a movable pad support coupled to the pan mount to move relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable pad support to cause the movable pad support to move relative to the pan mount, and wherein the pad includes a cushion cover located in spaced-apart relation to the seat pan and a cushion located between the cushion cover and the seat pan, the cushion cover includes a fixed end located in a fixed position relative to the seat pan, an adjustable end located in spaced-apart relation to the fixed end and configured to move in response to movement of the movable pad support, and a slip belt arranged to extend between and interconnect the adjustable end of the cushion cover and the pan mount.

11. The occupant-support base of claim 10, wherein a first portion of the slip belt is located between the movable pad support and the pan mount and a second portion of the slip belt is arranged to extend along an outer support surface of the movable support arranged to face away from the seat pan.

12. The occupant-support base of claim 11, wherein the first portion has a length greater than a length of the second portion when the occupant-support base is in the retracted configuration.

13. The occupant-support base of claim 12, wherein the length of the first portion is less than the length of the second portion when the occupant-support base is in the extended configuration.

14. An occupant-support base comprises
a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan, a pad coupled to the seat pan and adapted to be located between the seat pan and an occupant, the pad including an outer pad surface arranged to face away from the seat pan and an inner pad surface arranged to face toward the seat pan, and a pad-extension system configured to provide means for moving a portion of the pad relative to the seat pan between a retracted configuration in which the pad has a first dimension measured between the perimeter surface of the seat pan and a portion of the inner pad surface which confronts the perimeter surface of the seat pan and an extended configuration in which the pad has a relatively greater second dimension measured between the perimeter surface of the seat pan and the portion of the inner pad surface without causing a gap to be formed in a portion of the outer pad surface of the pad during movement from the retracted configuration to the extended configuration wherein the pad-extension system includes a pan mount coupled to the seat pan in a fixed position, a movable pad support coupled to the pan mount to move relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable pad support to cause the movable pad support to move relative to the pan mount, and wherein the pad includes a cushion cover located in spaced-apart relation to the seat pan, a cushion located between the cushion cover and the seat pan, and an extension cover member having a first end and coupled to an adjustable end of the cushion cover and a second end coupled to the pan mount in a fixed position.

15. The occupant-support base of claim 14, wherein the pad-support mover includes a first bracket arranged to move in a first direction to cause the movable pad support to move in the first direction to cause the extension cover member to unwind and establish the expanded configuration so that a distance between a first cover guide and an extension cover fixing member decreases.

16. The occupant-support base of claim 15, wherein the first bracket is arranged to move in a second direction opposite the first direction to cause the movable pad support to move in the second direction to cause the extension cover member to windup and establish the retracted configuration so that a distance between the first cover guide and the extension cover fixing member increases.

17. The occupant-support base of claim 16, wherein the pad-support mover includes an electric motor and a screw coupled to the electric motor to rotate in response to rotation of the electric motor and coupled to the movable pad support to cause the movable pad support to move as the screw rotates.

18. The occupant-support base of claim 16, wherein the pad-support mover is a pneumatic actuator.

19. The occupant-support base of claim 16, wherein the extension cover member is arranged to extend around and surround the first cover guide.

20. The occupant-support base of claim 14, wherein the cushion has a first thickness where the cushion is located between the outer surface of the seat pan and the cushion cover and a different second thickness where the cushion is located between the perimeter surface of the seat pan and the cushion cover.

21. The occupant-support base of claim 14, wherein the movable pad support includes a c-shaped cross section defined by a first end coupled to the pan mount, a curved body, and a second end spaced apart from the first end and the pan mount and the extension cover member is wound around the second end of the movable pad support.

22. The occupant-support base of claim 14, wherein the cushion includes a first end fixed to the pan mount and a second end that is adjustable relative to the movable pad support and a first distance between the second end of the cushion and the second end of the extension cover member when the occupant-support base is in the retracted configuration is less than a second distance between the second end of the cushion and the second end of the extension cover member when the occupant-support base is in the extended configuration.

* * * * *